Sept. 29, 1942.   C. H. WHITE   2,297,642
PLANTER
Filed Dec. 1, 1938   2 Sheets-Sheet 1

INVENTOR:
CHARLES H. WHITE
ATTORNEYS.

Sept. 29, 1942.          C. H. WHITE          2,297,642
                          PLANTER
                  Filed Dec. 1, 1938         2 Sheets-Sheet 2
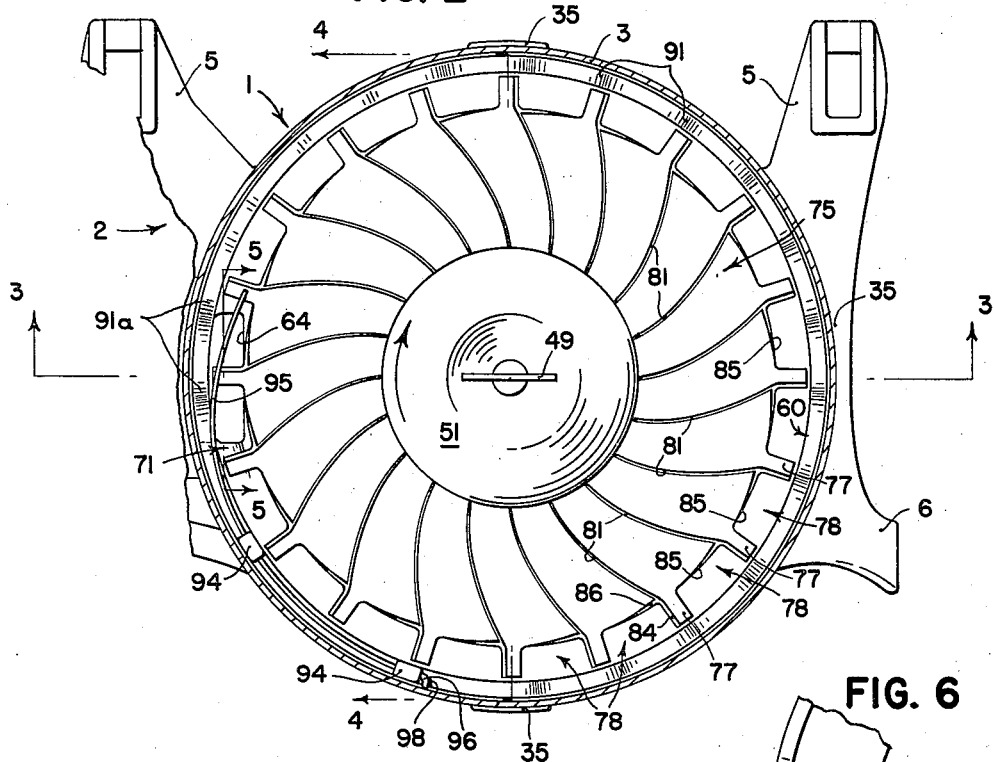
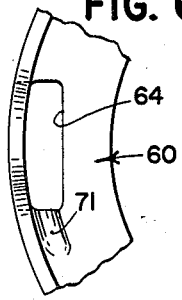
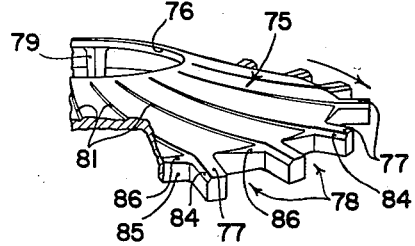
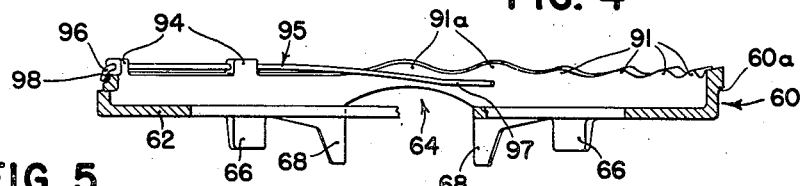
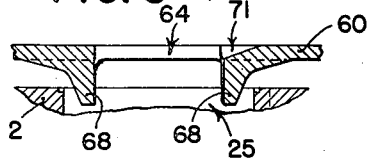
INVENTOR:
CHARLES H. WHITE
BY
ATTORNEYS.

Patented Sept. 29, 1942

2,297,642

UNITED STATES PATENT OFFICE 2,297,642

PLANTER

Charles H. White, Moline, Ill., assignor to Deere & Company, Moline, Ill., a corporation of Illinois Application December 1, 1939, Serial No. 307,132

26 Claims. (Cl. 221—138)

The present invention relates generally to planting mechanisms and more particularly to equipment for planting unshelled peanuts.

The object and general nature of this invention is the provision of a stationary bottom ring for the hopper of a planter and a rotary seed plate, both specially formed so as to handle unshelled peanuts. More specifically, it is a feature of this invention to provide the stationary bottom ring of the planter hopper with an upwardly facing irregular surface, preferably of an undulatory or scalloped nature, radially outwardly of the seed cells of the rotary plate, together with spiral shaped ridges on the rotary seed plate for working the peanuts lengthwise so that they drop into the seed cells aligned with the longitudinal axis of the peanuts extending generally peripherally. The spiral shaped ridges on the seed plate serve as means gently forcing the peanuts radially outwardly toward the seed cells, and the scalloped edge of the bottom ring exert an action on the peanuts tending to prevent bridging and to turn the peanuts so that they drop lengthwise into the seed cells. Further, the vertical reciprocatory action of the peanuts in the bottom portion of the seed can, caused by the movement of the mass of peanuts along the upwardly facing scalloped edge of the bottom ring works trash, such as stalks, stems, and the like, to the top of the peanuts, thereby preventing any interference with the planting operation.

A further feature of this invention is the provision of an improved cut-off which will not injure the peanuts. Preferably, the cut-off of the present invention is in the nature of a spring steel wire disposed generally in a horizontal plane just above the seed cells and during the rotation of the seed plate the wire cut-off serves the purpose of sweeping aside any peanuts lying on top of the peanut in the seed cells, preventing more than one peanut from passing through the seed cell into the seed delivery opening, and acting to hold any peanut or peanuts, which may get endwise vertically into a seed cell, against the radially inner wall or edge of the seed cell, so as to prevent the endwise disposed peanuts from dropping down and becoming jammed or crushed between an end of a seed cell and a wall of the seed delivery opening in the base. It is a further feature of this invention to provide a particular form of seed cell for facilitating the movement of the peanuts over filled seed cells until they come to an unfilled cell. It is also a feature of this invention to provide improved planting means for unshelled peanuts, particularly adapted to be used with cotton and corn planters of the convertible type, the present unshelled peanut planting means being especially adapted for operation with certain of the cotton and corn planting means, particularly planting mechanisms of the type having a picker wheel utilized in planting cotton and other linty seed.

These and other objects and advantages of the present invention will be apparent to those skilled in the art after a consideration of the following detailed description of the preferred structural embodiment, taken in conjunction with the accompanying drawings illustrating the preferred embodiment.

In the drawings:

Figure 2 is a view, similar to Figure 1, showing my improved unshelled peanut planting equipment;

Figure 4 is a section, taken along the line 4—4 of Figure 2, showing the bottom ring or peanut plate supporting member;

Figure 5 is a fragmentary section taken generally along the line 5—5 of Figure 2, showing the method of anchoring the bottom ring to the hopper base;

Figure 6 is a fragmentary top view showing the guiding groove leading into the seed delivery opening of the bottom ring; and Figure 7 is a fragmentary perspective view, partly in section, of the seed plate, showing in particular the spiral shaped ridges thereon.

Figure 1:
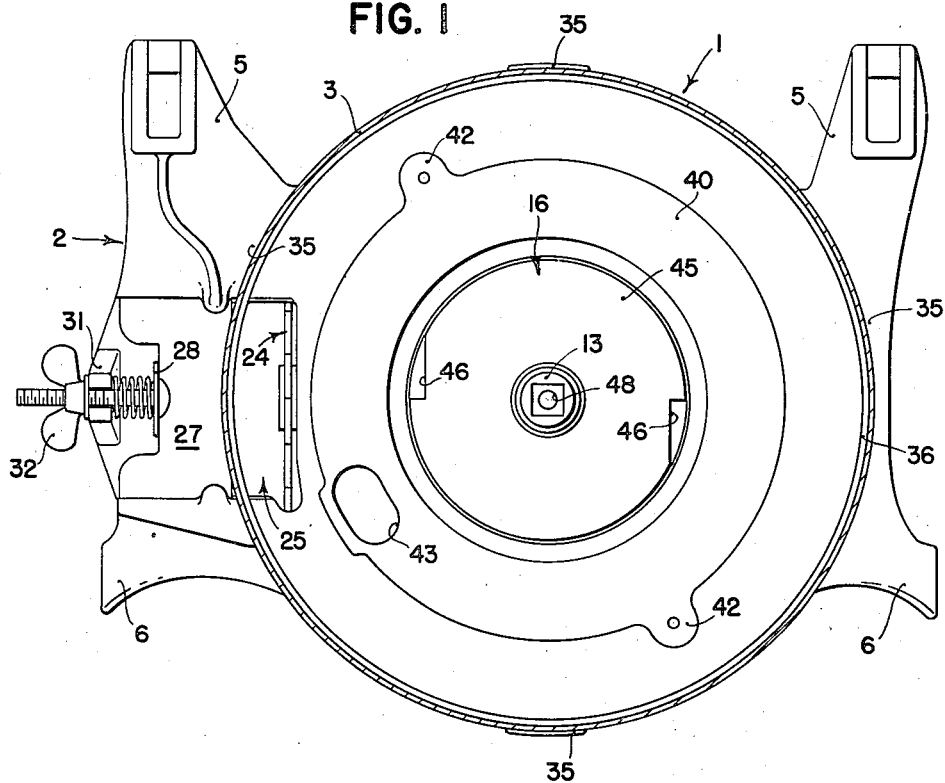
Figure 1 is a top plan view of the hopper, with the cover removed, of a cotton and corn planting mechanism, showing the same with the cotton and corn plates removed and ready for the reception of my improved peanut planting means.
Figure 3:
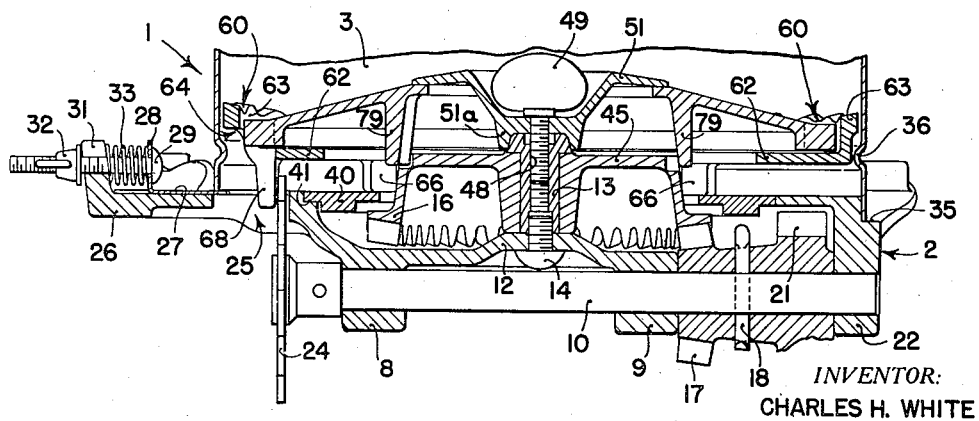
Figure 3 is a section taken generally along the line 3—3 of Figure 2.

Referring now more particularly to Figures 1, 2 and 3, the planting mechanism with which my invention is associated and forms a part thereof when planting unshelled peanuts includes a hopper 1 comprising a hopper base 2 and seed can 3 of more or less conventional construction. The hopper base 2 is provided with pairs of lugs 5 and 6, by which the hopper may be secured to any suitable supporting framework (not shown), and bearing brackets 8 and 9 in which a seeding shaft 10 is supported for rotation. The central portion of the hopper bottom 2, as indicated at 12, carries an upwardly extending pivot member 13, secured to the central section 12 by a bolt 14. Journaled for rotation on the pivot or bushing 13, is a gear 16 which is in mesh with a pinion 17 fixed, as by a cotter key 18, to the shaft 10. The pinion 17 includes a gear section 21 which is adapted to be connected to any suitable source of power for actuating the planting mechanism. The outer end of the shaft 10 outside of the gear 21 is received in a bearing boss 22. The other end of the shaft 10 has fixed thereto a cotton seed picker wheel 24 which extends upwardly along one wall of a cotton seed delivery opening 25 formed in the hopper bottom 2. This portion of the hopper bottom 2 is extended, as at 26, to form a shelf upon which a slide gate 27 is disposed. The gate 27 carries an ear 28 in which an adjusting bolt 29 is disposed, the threaded end of the latter extending outwardly through a smooth opening in an upstanding lug portion 31 of the shelf or bracket 26. A nut 32 is screwed onto the threaded end of the adjusting bolt and a spring 33 is disposed between the lug 21 and the ear 28. The purpose of the slide gate 27 is to adjust the effective width of the opening 25 and is used when the planting mechanism is arranged for planting cotton seed. The seed can 3 is secured to the hopper bottom 2 in any desired manner, as by being seated in shoulders 35 formed around the major portion of the hopper bottom 2, parts of the can 3 being bent over therebetween to secure the two hopper parts 2 and 3 together. At its lower portion, the seed can 3 is provided with an inwardly disposed bead 36 for the purpose of making seed-tight contact with parts of the planting mechanism that is carried in the hopper bottom, whereby the diameter of such parts may be some smaller than the diameter of the can 3 itself so that no difficulty will be experienced in placing and removing such parts from the top of the can.

As mentioned above, the present invention is particularly concerned with planters of the type that can be converted from a cotton seed planter to a corn planter, such as is disclosed in the patent to Charles E. White, 1,512,256, October 21, 1924, to which reference may be made if desired. When planting corn, a suitable corn plate (not shown) is disposed over and connected with the gear 16 and is supported upon a plate or ring, indicated in Figure 3 by the reference numeral 40. This ring seats in a groove 41 formed in the hopper base 2 and is reversible, for the purposes set forth in the above patent. The corn plate supporting member 40 is provided with a seed delivery opening 43 which is maintained in registration with a corn delivery opening or spout (not shown) formed in the hopper bottom 2. The corn plate support 40 is secured to the hopper bottom 2 against rotation in the groove 41 by any suitable manner, as by a pair of lugs 42 (Figure 1), the plate 40 being reversible from one position to the other to plant corn or cotton, respectively, the position of the plate 40 shown in Figure 3 being that in which cotton normally is planted. When planting cotton or other linty seeds, a cotton spider or agitating member having a series of peripheral teeth is mounted for rotation above the plate 40 in a position to cover the seed delivery opening 43 therein and to bring cotton seed into contact with the picker wheel 24 which engages the cotton seed and removes it from the mass within the hopper. The quantity of cotton seed taken out by the picker wheel may be adjusted by adjusting the position of the slide gate 27. The cotton spider and the corn plate are each provided with means making a driving connection with the gear 16. This means may take any suitable form, but preferably the enlarged hub section 45 of the gear 16 is provided with one or more recesses 46 in which a lug or lugs, carried by the cotton spider and the corn plate, are adapted to engage. Thus, when the shaft 10 is rotated and the picker wheel 24 driven, the gear 16 is also driven through the pinion 17, and hence the cotton spider plate is also driven, likewise the corn plate in the event the latter takes the place of the cotton spider. To hold the plate, whichever one is employed, in place the pivot bushing 13 is provided with a central threaded part 48 which receives a thumb screw 49. The latter serves to hold a seed plate retainer 51 against the associated seed plate so that the latter, the lugs of which engage in the driving recesses 46, rotates at all times with the gear 16.

The means for adapting the above described mechanism to the planting of unshelled peanuts will now be described. A bottom ring and cut-off plate, indicated in its entirety by the reference numeral 60, is mounted in stationary position on the hopper bottom and is provided with a radially inwardly extending flange or ledge 62 and an upwardly extending flange 63, joined together at the radially outer edge of the ledge 62. A peanut delivery opening 64 is formed partially in the radially outer portion of the ledge 62 and the lower part of the vertical flange 63, as best shown in Figure 3. The bottom ring 60 is provided with a series of lugs 66 which rest on the seed plate supporting ring 40. The lugs 66 are of sufficient length to raise the ledge 62 above the cotton seed picker wheel 24 so that when the peanut delivery opening 64 is registered with the cotton seed delivery opening 25 (Figure 3) there is sufficient clearance between the picker wheel 24 and the bottom ring to prevent interference, it being understood that when planting unshelled peanuts, the cotton picker wheel 24 merely rotates as an idle element, yet by virtue of the above-described support of the bottom ring, it is not necessary to remove the picker wheel when changing from a cotton planter to a peanut planter. The bottom ring 60 is held against rotation by means shown best in Figure 5. At each end of the peanut discharge opening 64 the bottom ring 60 carries a pair of spaced lugs 68 which are adapted to extend down into the cotton seed delivery opening 25. Thus, the lugs 68 not only prevent the bottom ring 60 from rotating but, in addition, hold the peanut delivery opening 64 in alignment with the cotton seed delivery opening 25. Figure 5 also shows a peanut guiding channel 71 which has its depth increased in the direction of rotation of the peanut plate, described below, and leads into the peanut delivery opening 64.

The peanut plate is best shown in Figures 2 and 7 and is indicated in its entirety by the reference numeral 75. The plate 75 is a shallow conical member having a central opening 76 and a plurality of teeth 77 spaced about the periphery of the plate 75, forming seed cells 78. The plate 75 is also provided with driving lugs 79. A plurality of generally radially extending spiral shaped ridges 81 extend radially outwardly from the central opening 76 to the outer edge of the plate 75. Between the ridges or ribs 81, the surface of the plate 75 is generally conical. The plate normally rotates in the direction of the arrow shown in Figures 2 and 7. Each tooth or lug 77 is beveled, as at 84, at its upper rear corner, and the radially inner wall 85 of each seed cell 78 is beveled, as at 86, in the manner shown, the bevels 84, 86 joining the ribbed section 81 in the manner best shown in Figure 7.

Referring again to the hopper bottom ring 60, it will be seen from Figures 2, 3 and 4 that the upwardly facing edge or surface of the vertical flange 63 is of irregular formation, being in the form of scallops or undulations, as indicated at 91. The scallops adjacent and above the peanut delivery opening 64 are somewhat higher than the other portions of the ring, this being for the purpose of providing additional material at this point so as to have the requisite strength to compensate for the disposition of the peanut delivery opening 64 at this point. The higher undulations or scallops are indicated by the reference numeral 91a. Also, certain of the scallops or undulations are omitted and in lieu thereof a pair of lugs 94 are provided. Each lug 94 is apertured in a circumferential direction for the purpose of receiving a spring wire cut-off and knocker, indicated in its entirety by the reference numeral 95. The wire 95 has an end 96 which is bent generally at right angles, best shown in Figure 2, and the wire is normally curved. The ring 60 is provided with a small recess 98 into which the end 96 is adapted to move when the spring wire cut-off 95 is forced through the openings in the lugs 94. Once the end 96 snaps into the recess 98, the spring wire member 95 is held in position. As best shown in Figures 3 and 4, the wire 95 is disposed substantially in a vertical plane just above the seed cells and, in general, lies above the aligned discharge or delivery openings 64 and 25, as shown in Figure 3. At this end the spring wire 95 (Figure 4) is formed to have a slight downward bend, as indicated at 97, to aid in knocking or forcing the peanuts out of the seed cells during the rotation of the seed plate 75.

The operation of my improved planting mechanism is substantially as follows.

When it is desired to plant unshelled peanuts, the cotton or corn plates and associated parts are removed from the hopper and the cotton gate 27 moved outwardly substantially to the limit. First the hopper bottom ring 60 is then seated against the bottom or base 2, with the lugs 68 at each side of the peanut delivery opening 64 extending into the hopper base seed delivery opening 25, thereby holding the hopper bottom ring 60 against rotation. From Figure 3 it will be seen that the lugs 66, which as best shown in Figures 3 and 4, extend downwardly from the radially inner portion of the ledge 62 of the ring 60, support the latter on the false ring or corn plate supporting member 40 a distance above the upper portion of the cotton seed picker wheel 24 sufficient so that the bottom ring 60 clears the picker wheel. It will also be noted that the peanut delivery opening 64 of the bottom ring 60 is disposed above and to the outer side of the picker wheel 24. The latter does not have any particular function during the peanut planting operation, but by virtue of the relations just described, it is not necessary to remove the picker wheel 24 when changing over from a cotton or corn planter to a peanut planter.

The bottom ring 60 fits substantially against the seed can bead 36, and preferably the bottom ring 60 is formed with a shoulder, indicated at 60a, which fits over the bead and brings the undulatory scallops 91 a bit closer to the wall of the seed can 3.

After the bottom ring 60 has been mounted in position the peanut plate 75 is placed on the ledge 62 of the bottom ring 60. To do this the associated teeth or lugs 77 are slipped underneath the free end of the wire 95 and then the seed plate 75 bottoms in the bottom ring 60, the driving lugs 79 on the seed plate engaging in the driving recesses 46 formed in the gear 16. Next the seed plate retainer 51 is placed over the central portion of the seed plate 75, the seed plate retainer 51 having a central section 51a which enters the central opening 76 in the seed plate 75, thereby centering the latter. The thumb screw 49 is then inserted through the central hole in the seed plate retainer 51 and threaded into the bushing or spindle 13 which is fixed to the central portion 12 of the hopper base or spider 2. The planting mechanism is then ready for operation in the field. The hopper 3 is then filled with seed peanuts and the power applied to the gear 21. The rotation of the latter drives the pinion 17 which, in turn, rotates the gear 16 and the seed plate 75 connected therewith. During the rotation of the seed plate, the spiral shaped ribs 81 cause a gentle but gradual movement of the peanuts in contact with the plate radially outwardly toward the seed cells therein. At the same time, the mass of peanuts resting on or supported by the seed plate 75, are also given a rotational movement. Now it will be remembered that the bottom ring 60, with the scalloped edge 91 is stationary. Therefore, during the rotation of the peanuts in the lower portion of the hopper, the peanuts are given a gentle but continuous vertical oscillation as the lower peanuts ride over the undulatory surface presented by the scalloped edge 91. There is, therefore, a gentle up and down movement of the peanuts which serves, first, to work trash, stems and the like to the top of the seed, and second, to cooperate with the rotary plate 75 to prevent peanuts from bridging across the seed cells instead of entering the same. As will be readily understood, any peanut that lies crosswise of the seed cell will have one end supported on the scalloped edge 91 while the other end engages the rotary plate; therefore, there will be a tendency for the rotation of the plate to swing the crosswise peanut longitudinally with respect to the periphery of the plate, thereby facilitating the entry of the peanut into the nearest unfilled seed cell.

As the filled seed cell approaches the seed delivery opening in the hopper bottom ring 60 during the rotation of the seed plate 75, the groove 71 permits the peanut to settle downwardly in the seed cell and in a position to fall through the opening 64. The spring wire cut-off 95 prevents another peanut from entering the cell when the first drops out through the seed delivery opening. If for any reason the peanut does not immediately discharge from the cell, the bent portion 97 of the spring wire 95 serves as a knocker to eject the peanut from the cell before the latter passes beyond the seed delivery opening.

It will be noted that the beveled edges 84 and 86 are disposed on the advancing side of the lugs 77, or at the rear end of the seed cells 78. This particular formation is of especial utility in facilitating the movement of the peanut from one cell to another when some of the cells are filled and the peanut cannot enter them. That is to say, if as the seed plate rotates a peanut approaches a cell that is already filled, the beveled edges 84 and 86 make it easy for the peanut to be moved on to the next cell, etc., until it finds one that is not filled. If a peanut should enter an unfilled cell in a vertical position, instead of longitudinally, and remain in that position as it approaches the discharge or seed delivery opening, there is some possibility that the peanut, thus vertically disposed, might become jammed in between the tooth or lug 77 behind it and the edge of the seed delivery opening. In order to prevent this, the spring wire 95 is arranged to be resilient in a horizontal direction, with the result that when a peanut in a vertical position reaches the wire, the latter urges the peanut against the radially inner wall 85 of the associated seed cell, thus holding the peanut and preventing it from dropping down and getting in between the lug and the end of the seed delivery opening. By the time the peanut again reaches the discharge opening, the resistance of the peanuts above will cause the peanut to align itself horizontally in the seed cell; if not, the spring wire 95 again prevents the peanut from falling down into the seed delivery opening.

While I have shown and described above the preferred structure in which the principles of the present invention have been embodied, it is to be understood that my invention is not to be limited to the particular details shown and described above, but that, in fact, widely different means may be employed in the practice of the broader aspects of my invention.

What I claim, therefore, and desire to secure by Letters Patent is:

1. Planting mechanism comprising a rotatable seed plate, and a stationary ring surrounding said seed plate and having an undulatory surface facing substantially directly upwardly for imparting vertical movements to the seed during rotation of the seed plate.

2. Planting mechanism comprising a seed can, a rotatable seed plate mounted therein and having a plurality of seed cells around the periphery of the plate, and a stationary ring surrounding said plate radially outwardly of said seed cells and having an irregular surface facing substantially directly upwardly and serving to align the seed with the seed cells during rotation of the plate relative to said ring and forming the sole retarding means, other than said seed can, for said seed, the vertical dimension of said ring varying to provide said irregular surface.

3. Planting mechanism comprising a rotatable seed plate against which the seed bear, said plate having generally radially extending ridges on its upper surface whereby the rotation of the plate tends to rotate the mass of seed resting above the plate, and stationary means comprising a ring member disposed radially outwardly of the seed plate and having an irregular undulatory surface for imparting generally vertical movement to the radially outer portions of the seed mass during rotation of the plate.

4. Planting mechanism comprising a hopper having a bottom, the latter having a seed discharge opening therein, a rotatable seed plate supported movably on the hopper bottom and having a plurality of seed cells disposed around the periphery of said plate, a stationary ring disposed loosely in the hopper bottom below and radially outwardly of said seed plate, said ring having a seed discharge opening disposed in a position underneath the seed cells, means on the ring engageable with the walls of the seed discharge opening in the hopper bottom for aligning the seed discharge openings in the ring and hopper bottom and to hold the ring agenst rotation, and a cut-off wire anchored at one end to said stationary ring and extending generally circumferentially and radially inwardly over said seed plate above said aligned openings in the ring and the hopper bottom.

5. In a planting mechanism, a stationary ring member having a generally radially inwardly extending plate receiving flange and a generally axially upwardly extending flange, the upper edge of which is of irregular formation, said radially inwardly extending flange having a seed discharge opening in the side adjacent said upwardly extending flange, and a spring wire cut-off member anchored to said upwardly extending flange and having a seed ejecting portion disposed above said seed discharge opening and below the upper irregular edge of said upwardly extending flange.

6. In a planting mechanism, a stationary ring member having a generally radially inwardly extending plate receiving flange and a generally axially upwardly extending flange, the upper edge of which is of irregular formation, said radially inwardly extending flange having a seed discharge opening in the side adjacent said upwardly extending flange, and a pair of locating lugs formed on the under surface of the radially extending flange generally at the ends of said seed discharge opening.

7. In a planting mechanism, a stationary seed agitating ring comprising an annular member having a radially inwardly extending flange and a generally axially extending flange joined to the radially outer portions of said first mentioned flange, the upper edge of said axially extending flange being irregular in form, said ring having a seed discharge opening formed partially in said radially extending flange and partially in the adjacent part of said axially extending flange, the latter having a greater axial dimension adjacent said seed discharge opening.

8. The combination with a planting mechanism comprising a seed holding device having a base plate structure provided with a seed discharge opening and a toothed picker wheel extending upwardly to and mounted for rotation in said opening, of a stationary annular member having a seed plate receiving ledge and a seed discharge opening, and means for supporting said annular member on said base plate structure above said picker wheel with said openings in at least approximate alignment.

9. The combination with a planting mechanism comprising a seed holding device having a base plate structure provided with a seed discharge opening, a toothed picker wheel extending upwardly through and mounted for rotation in said opening, and means for driving said picker wheel, of a stationary annular member having a seed plate receiving ledge and a seed discharge opening, means for holding said annular member against rotation, means for supporting said annular member on said base plate structure above said picker wheel with said openings in at least approximate alignment, a rotatable seed plate supported on said ledge, and means for driving said seed plate from the means that drives said picker wheel.

10. In a planter, the combination of a hopper, a base plate at the lower end of the hopper and having an exit opening communicating with the interior of the hopper, a rotary seed plate fitting upon the base plate and provided with seed cells for successive communication with said exit opening, and a spring wire sweep serving as a cut off and curving radially inwardly and circumferentially in the direction of rotation of said seed plate over said seed cells thereof in a generally horizontal plane, one end of the wire being fixed to the hopper and the main portion of the wire extending from said fixed end in said horizontal plane so as not to interfere with rotary movement of the seed in the hopper.

11. Planting mechanism for unshelled peanuts, comprising a hopper, a base member at the lower end thereof having a peanut delivery opening, a rotary peanut plate fitting upon said base member and provided with seed cells receiving peanuts and adapted to communicate successively with said delivery opening, and a spring wire sweep lying substantially in a horizontal plane and having an end disposed just above the seed cells and resilient against outward movement radially of said rotary seed plate, said sweep extending generally circumferentially of the seed plate in the direction of movement of the latter, with its outer end portion curving radially inwardly to a point adjacent the radially inner portions of the seed cells, whereby said wire sweep serves to resiliently press a peanut that is disposed vertically in one of the seed cells against the radially inner wall of said cell, thereby preventing said vertically disposed peanut from dropping down partially into said delivery opening and becoming jammed and crushed between the seed cell and said delivery opening in the base.

12. In a planter, the combination of a seed carrying and delivering device comprising a base having a seed delivery opening, and a toothed picker wheel extending upwardly to and mounted for rotation in said opening, of a stationary seed aligning ring member having a seed delivery opening adapted to be aligned with said first opening and means extending downwardly into the seed delivery opening in said base and alongside the picker wheel for holding said ring member in position on said base and preventing displacement of the seed by the picker wheel.

13. In a convertible cotton and corn planter having a base provided with a cotton seed delivery opening and a corn plate support disposed generally radially inwardly of said cotton seed delivery opening, the combination therewith of unshelled peanut planting mechanism comprising a stationary peanut plate supporting ring having a peanut delivery opening adapted to be aligned with said cotton seed delivery opening, and means generally radially inwardly of said peanut discharge opening and engageable with said corn plate support generally radially inwardly of said cotton seed discharge opening for supporting said ring on said corn plate support.

14. In a convertible planter, the combination with a base having a cotton seed delivery opening, a cotton seed picker wheel rotatable in said opening, and means for driving said picker wheel, of peanut planting means comprising a stationary ring having a peanut delivery opening adapted to be aligned with said cotton seed delivery opening, means for supporting said ring above said picker wheel, and a peanut plate supported on said ring driven from said picker wheel driving means and arranged to discharge peanuts through said peanut delivery opening alongside said picker wheel and through said cotton seed delivery opening.

15. A bottom ring for a planter, comprising a seed plate receiving section and a generally vertically disposed section adapted to be disposed radially outwardly of the seed plate, wire receiving means carried by said radially outer section there being a recess in said last named section adjacent said wire-receiving means, and a spring wire cut-off carried by said wire-receiving means and having one end anchored in said recess.

16. A bottom ring for a planting mechanism, comprising a generally vertically disposed flange and a seed plate receiving section, said flange having a pair of lugs apertured generally in a circumferential direction, there being a small recess adjacent one of said lugs, and a spring wire cut-off disposed in the apertures of said lugs and having one end bent so that when said wire cut-off is inserted in said apertures and the bent end disposed in said recess, said wire cut-off is anchored to said flange.

17. In a planter, a stationary member adapted to receive a seed plate, a spring wire cut-off for said plate, means carried by said member to receive and support said wire cut-off, said means being apertured in a generally circumferential direction and said wire cut-off being curved, whereby said wire cut-off is held against rotation in said apertured means, and a recessed section on said stationary member, one end of said wire cut-off being bent so that when said wire cut-off is disposed in said circumferentially apertured means and the bent end disposed in said recessed section, said wire cut-off is anchored to said stationary member.

18. Planting mechanism for unshelled peanuts, comprising a hopper, a base member at the lower end thereof having a peanut delivery opening, a rotary peanut plate supported upon said base member and provided with seed cells receiving peanuts and adapted to communicate successively with said delivery opening, and a resilient spring wire sweep anchored at one end to said base member and having a portion lying substantially in a horizontal plane just above the seed cells, said portion extending generally circumferentially of said plate in the direction of movement thereof and extending generally diagonally inwardly across the path of movement of said seed cells, whereby a peanut that is disposed vertically in a seed cell will be engaged by the wire sweep and held against dropping out of the seed cell while in endwise vertical position.

19. Planting mechanism comprising the combination of a seed plate support having a stationary part disposed radially outwardly of the seed plate and provided with a substantially directly upwardly facing surface of irregular wave-like contour extending above the adjacent portions of the seed plate, a rotatable seed plate having peripheral seed cells and a central section provided with ribs whereby rotation of said seed plate causes rotation of the mass of seeds above said plate, said ribs being curved backwardly with respect to the direction of rotation of said plate whereby to impart, in addition to said rotation, a generally radially outward movement of the seed toward said stationary part, the latter serving to impart vertical agitation to the outer portions of the mass of seed as the latter is rotated by the ribs on said plate, and a spring wire cut-off disposed just above the seed plate and lying in a substantially horizontal plane so that it offers no material restriction to the rotation of said mass of seed by said plate.

20. Planting mechanism comprising a hopper having a bottom, the latter having a seed discharge opening therein, a rotatable seed plate supported movably on the hopper bottom and having a plurality of seed cells disposed around the periphery of said plate, a stationary ring disposed in the hopper bottom below and radially outwardly of said seed plate, said ring having a seed discharge opening disposed in a position underneath the seed cells, and a cut-off wire anchored at one end to said stationary ring and extending generally circumferentially and radially inwardly over said seed plate above said aligned openings in the ring and the hopper bottom.

21. In a planting mechanism, a stationary ring member having a portion with a seed discharge opening and a generally upwardly extending flange, the upper edge of which is of irregular formation, and a spring wire cut-off member anchored to said upwardly extending flange and having a seed ejecting portion disposed above said seed discharge opening and below the upper irregular edge of said upwardly extending flange.

22. In a planting mechanism, a stationary ring member having a generally radially inwardly extending plate receiving flange and a generally axially upwardly extending flange, said radially inwardly extending flange having a seed discharge opening in the side adjacent said upwardly extending flange, and a pair of locating lugs formed on the under surface of the radially extending flange generally at the ends of said seed discharge opening.

23. Planting mechanism comprising the combination of a seed plate support having a stationary part disposed radially outwardly of the seed plate and provided with a substantially directly upwardly facing surface of irregular wave-like contour extending above the adjacent portions of the seed plate, a rotatable seed plate having peripheral seed cells and a central section provided with ribs whereby rotation of said seed plate causes rotation of the mass of seeds above said plate, said stationary part serving to impart vertical agitation to the outer portions of the mass of seed as the latter is rotated by the ribs on said plate, and cut-off means disposed just above the seed plate and lying in a substantially horizontal plane so that it offers no material restriction to the rotation of said mass of seed by said plate.

24. In a planting mechanism, a rotary seed plate of the type having seed cells adapted to receive seed lengthwise therein, and a stationary ring member having a generally axially directed flange extending upwardly above the edge of said plate, the upper surface of said flange being of generally wave-like formation, whereby seed moved along said surface by the rotation of said seed plate will be given a vertical movement and will be worked lengthwise of the seed cells to facilitate the seed entering the cells while trash and the like will be worked upwardly.

25. In a planting mechanism, the combination of a base plate structure, means carried by the base plate structure and extending above the latter, an annular member comprising a ring mounted on said base plate structure and having an axially upwardly extending flange and a radially inwardly extending flange, the latter having a plurality of supporting lugs extending from the side thereof for supporting said ring on said base plate structure above said upwardly extending means.

26. In a planting mechanism, a rotary seed plate having seed cells adapted to receive seed therein, and a stationary ring member having a generally axially directed flange extending upwardly above the edge of said plate, the upper surface of said flange being of generally wave-like formation, whereby seed moved along said surface by the rotation of said seed plate will be given a vertical movement to facilitate the seed entering the cells while trash and the like will be worked upwardly.

CHARLES H. WHITE.